United States Patent [19]

Gillbrand et al.

[11] Patent Number: 4,648,367

[45] Date of Patent: Mar. 10, 1987

[54] METHOD AND APPARATUS FOR DETECTING ION CURRENT IN AN INTERNAL COMBUSTION ENGINE IGNITION SYSTEM

[75] Inventors: Per Gillbrand, Mariefred; Hans Johansson; Jan Nytomt, both of Åmål, all of Sweden

[73] Assignee: Saab-Scania Aktiebolog, Södertälje, Sweden

[21] Appl. No.: 810,186

[22] Filed: Dec. 18, 1985

[30] Foreign Application Priority Data

Dec. 19, 1984 [SE] Sweden ............................... 8406457

[51] Int. Cl.[4] ...................... F02P 17/00; G01M 15/00

[52] U.S. Cl. .................................. 123/425; 123/435; 73/35; 73/115

[58] Field of Search ............... 123/425, 435, 480, 481, 123/417; 73/35, 115

[56] References Cited

U.S. PATENT DOCUMENTS

| | | | |
|---|---|---|---|
| 3,075,224 | 5/1962 | Whaley et al. | 73/35 |
| 4,232,545 | 11/1980 | Dobler et al. | 123/425 |
| 4,233,943 | 11/1980 | Rogora et al. | 123/425 |
| 4,290,398 | 9/1981 | Hattori et al. | 123/425 |
| 4,308,519 | 12/1981 | Garcea et al. | 123/425 |
| 4,359,893 | 11/1982 | Kizler et al. | 73/115 |
| 4,417,556 | 11/1983 | Latsch | 123/425 |
| 4,491,110 | 1/1985 | Bone et al. | 123/425 |
| 4,515,132 | 5/1985 | Anderson et al. | 73/115 |
| 4,535,740 | 8/1985 | Ma | 123/425 |
| 4,542,727 | 9/1985 | Britsch et al. | 123/425 |
| 4,549,514 | 10/1985 | Abe et al. | 123/425 |

*Primary Examiner*—Raymond A. Nelli

*Attorney, Agent, or Firm*—Cushman, Darby & Cushman

[57] ABSTRACT

The invention relates to a method for detecting ion current in an ignition circuit included in the ignition system of an internal combustion engine, where a measuring voltage is applied to the ignition circuit and a measuring device is utilized for detecting ion current possibly present in the ignition circuit. In known solutions of this kind, it has been necessary to use comparatively expensive electronic components, usually not manufactured as standard, to protect the outside voltage source from high voltages occurring in the ignition circuit. The problems are aggravated when the prior art is applied to capacitive ignition systems. The present invention solves the problems involved in an advantageous manner and is essentially distinguished in that a constant measuring voltage is applied to the grounded connection of the ignition circuit between a secondary winding of the ignition circuit and a capacitor in the ground connection, and in that a possible ion current in the ignition circuit is detected in means, by a signal representing the ion current being taken off from the ground connection of the secondary winding.

14 Claims, 2 Drawing Figures

Figure 1:
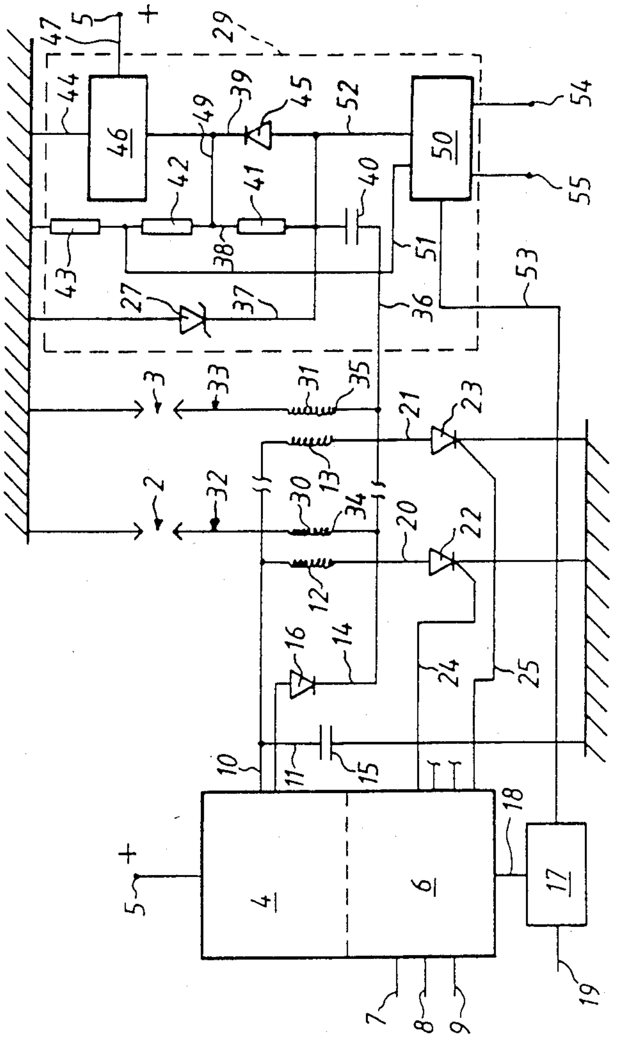

METHOD AND APPARATUS FOR DETECTING ION CURRENT IN AN INTERNAL COMBUSTION ENGINE IGNITION SYSTEM

The present invention relates to a method of detecting ion current in an ignition circuit included in the ignition system of an internal combustion (I.C.) engine, where a measuring voltage is applied to the ignition circuit and a measuring device is utilised to detect any possible ion current in the circuit.

The German patent specifications DOS No. 2 802 202 and DOS No. 3 006 665 teach arrangements where an ion current in an I.C. engine ignition circuit is sensed for detecting knocking in the engine combustion chambers. To create an ion current there is utilised a measuring voltage applied to the electrodes of the conventional spark plug. The measurement voltage is taken from a source consisting of a so-called measuring capacitor, which is charged to a predetermined level by an outside voltage source. The outside voltage fed to the capacitor is an ignition voltage induced in the secondary winding of an ignition coil, or alternatively, a voltage in the primary winding of an ignition coil.

In these arrangements of the prior art, the outside measuring voltage source is connected to the ignition circuit between the secondary winding and the spark plug central electrode, and more specifically between an ignition voltage distributor in the ignition circuit and the plug. In this part of the ignition circuit there are high ignition voltages at every ignition instant, and special elements are used in the prior art to protect the measuring voltage source from these voltages. The elements take the form of protective resistors or high voltage diodes, which are comparatively expensive electronic components.

These known arrangements are intended for application in conventional inductive ignition systems. In contrast to a capacitive ignition system, an inductive system has an ignition voltage that is considerably lower and of longer duration. The application of said known arrangements to capacitive ignition systems would therefore amplify the problems of protecting to a reasonable cost the measuring voltage source against the high ignition voltages.

The purpose of the present invention is to eliminate the above-mentioned disadvantages and to provide a method as mentioned in the introduction, which may be advantageously utilised in capacitive ignition systems. The invention is thus distinguished in that a substantially constant measuring voltage is applied to the ignition circuit in the ground connection between a secondary winding of an ignition coil and a measuring capacitor disposed in the connection, and that ion current in the ignition circuit is detected in means intended for this purpose, by taking off a signal representing the ion current in the ground connection of said secondary winding.

The use of high voltage diodes or protective resistors for protecting the measuring voltage source against the ignition voltage is entirely avoided by the inventive solution. The supply of a constant measuring voltage at least during the measuring sequence enables the measurement of ion current to take place at any time during the rotation of the crankshaft, excepting the time period, the so-called spark duration, during which the ignition voltage maintains a spark between the spark plug electrodes.

There are thus created the conditions for detecting abnormal combustion in the engine combustion chambers, both those occurring before the spark has ignited the fuel-air mixture and those occurring thereafter. Furthermore, in a capacitive ignition system the measuring capacitor in the ignition circuit causes an extension of the spark duration, resulting in more reliable and smooth combustion in the engine, particularly before it has attained its normal working temperature.

An advantageous, inventive method applied to a multi-cylinder Otto-type engine is distinguished in that for manually initiated voltage supply for starting an engine, ignition pulses are generated in at least one ignition circuit when the piston in the cylinder pertaining to the ignition circuit is at its top dead centre (T.D.C.);

a signal representing a time interval during which ignition pulse-generated combustion may be obtained is applied to the detection means for the ignition circuit of the mentioned cylinder, and that a signal representing ion current is processed in the detection means during said time interval for detecting possible combustion, and for delivering a corresponding output signal which is to serve as a basis for further ignition pulses generated in a predetermined order in all ignition circuits.

The above method enables the cylinder in which combustion actually does take place, to be readily decided on starting an engine. In a computer controlled ignition system without a mechanical ignition voltage distributor the cylinder thus identified is used as the starting point for ignition voltage triggering to the respective cylinder in a predetermined order for continued operation of the engine. There is thus eliminated the need of a camshaft transducer used in known solutions for cylinder identification.

The inventive solution may thus be used for detecting both early ignition, so-called pre-ignition, and knocking, as well as for cylinder identification and protracted spark formation, these functions having particularly advantageous application in capacitive, distributor-free ignition systems.

The present invention also includes an arrangement for carrying out the inventive method. In such a case the arrangement is included in an I.C. engine ignition system with at least one ignition circuit, in which are included the secondary winding of an ignition coil and means for igniting the fuel-air mixture in the combustion chambers of an engine, the ignition circuit being connected to an outside voltage source which, if there is combustion in the combustion chamber, causes ion current in the circuit. Distinguishing for the inventive arrangement is that the outside voltage source is connected to the ignition circuit between a measuring capacitor and one end of the secondary winding, the other end of which is connected to a central electrode of the ignition means, and that the measuring capacitor is included in a line connected to ground and departing from said one end of the secondary winding, the means for detecting ion current flowing in the ignition circuit being connected to said line.

Figure 2:
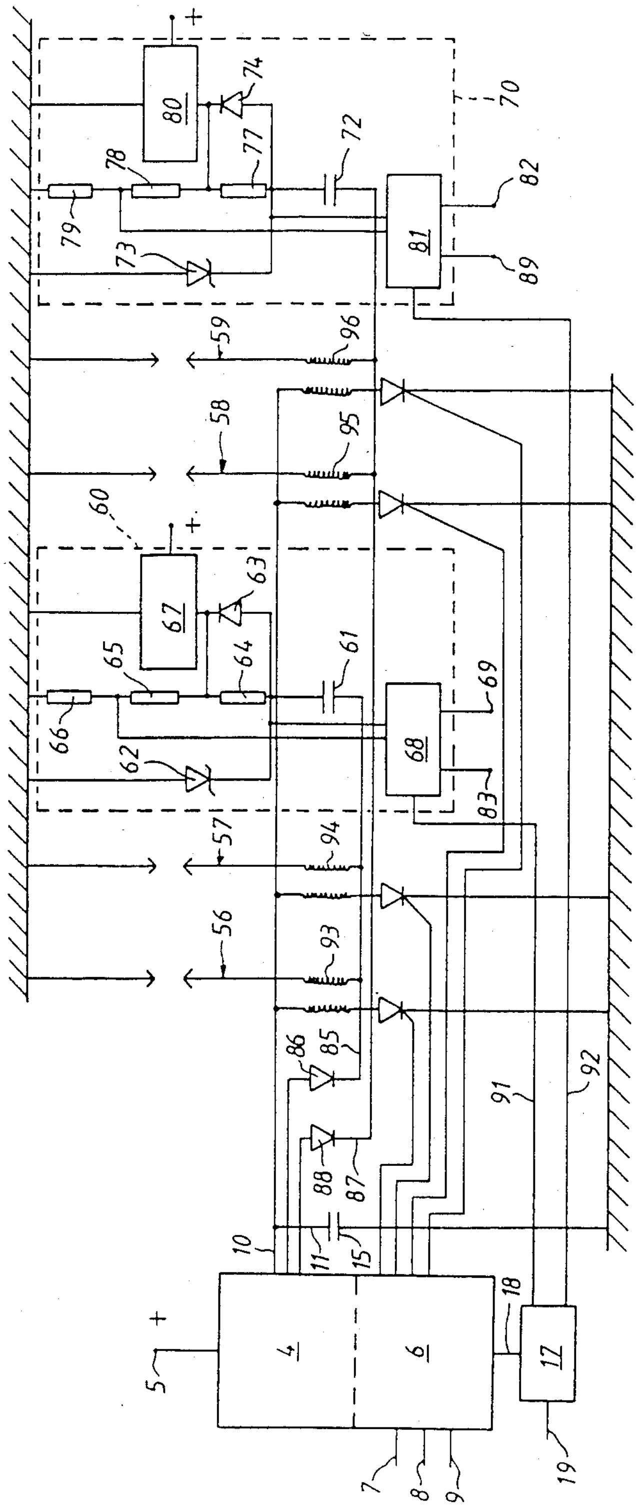

Further features distinguishing the invention will be seen from the accompanying claims and the following description of an embodiment exemplifying the invention. It is described with reference to the accompanying Figures, where:

FIG. 1 schematically illustrates a capacitive ignition system equipped with an inventive arrangement for detecting ion current, and FIG. 2 illustrates an alternative embodiment of the inventive arrangement, which includes two devices for measuring ion current.

The ignition system principly illustrated in FIG. 1 is of the capacitive type and is applicable to a multi-cylinder, Otto-type engine, although only two of the spark plugs 2,3 intended for the engine cylinders have been shown. In the system there is included a charging circuit 4, obtaining voltage feed from a low-voltage source 5, e.g. a 12 volt battery. After transforming up, the charging circuit 4 supplies a voltage of about 400 V to a line 10, to which there is also connected a line 11 to a charging capacitor 15, in turn connected to ground. This capacitor is thus charged to about 400 V and is in communication via the line 10 with primary windings 12,13, coupled in parallel, of a number of ignition coils corresponding to the number of engine cylinders. Each primary winding 12,13 is connected to a line 20,21 respectively, which is in turn connected to ground across a thyristor 22,23, respectively. Via signals on lines 24,25 respectively, the thyristors 22,23 can open the ground connection 20,21, of the primary windings 12,13, respectively, the lines 24,25 coming from an ignition pulse triggering unit 6, hereinafter designated trigger unit. The latter receives on lines 7,8,9 input signals relating to engine revolutions, load and crankshaft angular position, and generates, after processing said signals in a microcomputer-based system incorporated in the trigger unit output signals in response to said input signals. Since said system is no part of the present invention it is not described further here. When the ground connection of the primary windings 12,13 opens as a consequence of a triggering signal being sent to the thyristor 22,23, respectively, the capacitor 15 is discharged to ground via the line 20,21, respectively. The appropriate primary winding then induces a high ignition voltage (about 40 kV) in its corresponding secondary winding 30,33 respectively. The secondary winding is included in an ignition circuit 32,33 respectively, supplying voltage to the spark plug 2,3 respectively, for igniting the fuel-air mixture fed into the respective combustion chamber.

The negative end of the secondary winding 30,31, respectively, is in communication with the central electrode of the spark plug 2,3, respectively, this electrode thus obtaining a first negative ignition voltage pulse for sparking over to the electrode body, which is grounded. The other, positive, end 34, 35 respectively, of the secondary winding 30,31, respectively, is grounded via a line 36, which includes a measuring device 29. Associated with the latter there is, inter alia, a measuring capacitor 40 in series with three lines 37,38,39 connected in parallel, each of the latter completing the grounding connection and also co-acting, in a manner explained below, with a detector unit 50 included in the measuring device 29.

A line 14 for voltage supply from the charging circuit 4 connects to the line 36 between the positive ends 34,35 of the secondary windings, 30,31 and the capacitor 40. In the charging circuit 4 a voltage is generated which is used for charging the capacitor 15, and this voltage is fed via a diode 16 in the line 14 to the capacitor 40 in the line 36.

Of the lines 37,38,39 leading to ground and connected to the capacitor 40, the line 37 includes a Schottky diode 27 with its cathode connected to the capacitor 40 and its anode to ground. The line 38 includes three resistors 41,42,43 in series, of which resistor 43 leads directly to ground. The line 39 includes a diode 45 with its cathode connected to a voltage stabiliser 46 functioning as a low voltage source and connected to ground by a line 44. Said voltage stabiliser is also via a line 47 connected to the low voltage source 5, which also serves the charging circuit 4.

A line 49 from the low voltage source 46 is connected between the resistors 41,42, and between the resistors 42,43 there is a voltage transfer via a line 51 to the detector unit 50. The line 51 transfers a reference voltage to the detector unit 50, while a line 52 takes the voltage between the capacitor 40 and resistor 41 as an actual value to the detector unit 50. In accordance with the invention, a comparison takes place between the reference value on the line 51 and the actual value on the line 52, said comparison takes place in a comparator included (not shown) in the detector unit 50. This part of the invention is well known to one skilled in the art and is therefore not described further.

A signal on a line 53 from a measurement window unit 17 is also fed to the detector unit 50. The measurement window unit obtains on a line 18 from the trigger unit 6 an input signal relating to the time for triggering the ignition pulse, and on a line 19 an input signal relating to the prevailing crankshaft angular position. The output signal of the unit 17 on the line 53 represents those ranges of the crankshaft angle, the so-called measurement windows, over which the detector unit 50 shall operate for deciding whether ion current flows in the ignition circuits 32,33 or not. The detector unit 50 thus sends on a line 54 an output signal representing either "detected" or "undetected" ion current in said measurement window.

The described arrangement functions as follows. When the measuring capacitor 40 is being charged, current flows from the low voltage source 5, charging circuit 4, line 14 via diode 16 to one plate of the measuring capacitor 40. The other plate thereof closes the current circuit via the line 39, diode 45, voltage stabiliser 46 and its connection 47 to the low voltage source 5. When ignition voltage is induced in the ignition circuits 32,33 an alternating voltage occurs, and its first negative pulse causes the spark between the electrodes of the respective spark plug 2 or 3. A current then flows from the body electrode of the spark plug to its central electrode and further through the secondary winding 30,31, respectively, and line 36 to one plate of the capacitor 40. The current circuit is closed by current flowing from the other plate of the capacitor 40 through the line 39 with the diode 45 to the voltage stabiliser 46 and through its grounding connection 44 to ground.

In a corresponding manner the positive pulses of the ignition voltage cause a current in the opposite direction between the spark plug electrodes. In this case the current circuit is closed by current flowing via the Schottky diode 27, which is grounded via the line 37, through the capacitor 40 and the secondary winding 30 or 31 to the respective spark plug 2 or 3.

The positive measuring voltage of about 400 volts supplied by the charging circuit 4 via the line 14 occurs between the electrodes in the ignition circuits 2,3 and thus in the latter during the whole of the crankshaft revolution. If an undesired combustion occurs, e.g. due to pre-ignition, before the combustion sparked by the ordinary ignition, or as a result of knocking after ordinary ignition has commenced, the measuring voltage causes an ion current between the spark plug electrodes. Since the measuring voltage is positive, an ion current is obtained that flows from the spark plug control electrode to its body electrode. A current circuit is thus closed from the measuring capacitor 40, serving as measuring voltage source, via the appropriate secondary winding and spark plug electrodes, the grounded voltage stabiliser 46, resistor 41 and back again to the capacitor 40. A certain proportion of the ion current is taken to the resistor 41 functioning as measuring resistor, also via the grounded, series-connected resistors 42,43.

There is a potential drop across the measuring resistor 41 when the ion current flows through it. The potential prevailing in the line 52 when there is no ion current thus falls from a value, e.g. 5 V, maintained by the voltage stabiliser 46, to a value of −0.2 V. This latter value is determined by the Schottky diode 27 for the purpose of protecting the detector unit 50 from any large negative voltage. The lowered potential is taken by the line 52 as an actual value to the detector unit 50. The comparison with the reference value on the line 51 results in a change in the output signal on the line 54 from the detector unit 50, providing that a comparison has really been carried out. When the comparison takes place is determined by the measurement window signal on the line 53. This signal is of square wave form, and when "high" is said to have a window that allows the detector unit to carry out the comparison.

The measurement windows represent the time interval before and after ignition, when pre-ignition and knocking can occur in a combustion chamber. By use of microcomputer technology, the unit 6 decides together with the measurement window unit 17 that the pre-ignition window delivered during a certain time interval, followed by a knocking window relate to a certain cylinder, i.e. the cylinder whose spark plug receives ignition voltage during the same time interval. The measurement window signal thus has several sequential window pairs, each of which relate to a specific cylinder.

The time interval represented by the windows may be represented by a pre-determined crankshaft angle range both before and after ignition. This range is defined by an angular position in degrees in relation to the T.D.C. position of the appropriate piston. Pre-ignition can thus occur from 90° before piston T.D.C. to immediately before, i.e. a degree or two, ignition voltage generation. The end of the pre-ignition window is calculated by the microcomputer in unit 6 on the basis of the calculated ignition time. In order that reliable detection of the ion current can occur also for relatively high engine revolutionary rate, e.g. 6000 r.p.m., the pre-ignition window should cover at least 5° within the range from 90° before piston T.D.C. to the angular position of the crankshaft given above, immediately before ignition voltage generation.

Knocking may be detected in a measurement window which begins as soon as the spark is extinguished and which terminates at the latest by 50° after piston T.D.C. The window should cover at least 5°, and with capacitive systems it should begin at piston T.D.C. for high R.P.M. engines also, due to the very short spark duration in capacitive systems. At 6000 R.P.M. the capacitive spark has a duration equivalent to only 3 to 4 degrees. The spark in the inductive system has a duration equivalent to about ten times as many degrees at these R.P.M. before it is extinguished. The measurement window in inductive systems therefore opens much later than for a capacitive system. The computer in the trigger unit 6 can calculate for any R.P.M., and according to a stored program, the time for the window, at the same time also taking into account prevailing engine load etc..

Furthermore, in starting an engine, the inventive solution may be used to decide when combustion is taking place in a certain cylinder. This information is then used as the starting point in the microcomputer system of the trigger unit 6 to calculate the right order of subsequent ignition pulses to the remaining cylinders. In an ignition system without a distributor as illustrated in FIG. 1, an expensive camshaft transducer can be eliminated, which was previously required for performing cylinder identification.

In the system illustrated in FIG. 1, cylinder identification is initiated coincidental with beginning the engine starting sequence by voltage supply to the system via an unillustrated, manually operable ignition lock. On the basis of a signal from the crankshaft transducer the trigger unit 6 then sends a triggering signal solely to one ignition circuit. The measurement window unit 17 simultaneously sends a signal with a window covering at least 5° before the piston T.D.C. and 180° after it to the detector unit 50. Should ion current be detected in said window, this is taken as an indication that combustion has taken place in the cylinder in the ignition circuit of which an ignition spark has been generated. The piston in this cylinder has thus been in position for ignition, and the output signal on the line 55 of the detector unit 50 can be used by the trigger unit computer for determining subsequent ignition pulse sequences.

In FIG. 2 there is illustrated an inventive solution that has been modified in relation to the one in FIG. 1, there being two measuring devices 60,70 for detecting ion current in four ignition circuits. The parts in FIG. 2 having correspondence in FIG. 1 retain the functions given in FIG. 1. The following description of the solution illustrated in FIG. 2 is thus restricted to the difference relative to FIG. 1.

Two ignition circuits 56,57 have an grounding line common to their respective secondary windings 93,94, this line including a measuring capacitor 61, diodes 62,63, resistors 64–66 and a voltage stabiliser 67, all of which coact with a detector unit 68 for detecting ion current as described for corresponding means in FIG. 1. The same applies to the measuring device 70 associated with the two other ignition circuits 58,59, this device comprising a measuring capacitor 72 included in the grounding line to the secondary windings 95,96 of the ignition circuits 58,59, a voltage stabiliser 80 and a detector unit 81. The charging circuit 4 maintains via a line 85 containing a diode 86 a constant measuring voltage at the plate of the measuring capacitor 61 facing towards the secondary windings 93,94. Measuring voltage is supplied in a corresponding way to the measuring capacitor 72 via a line 87 including a diode 88. The measurement window unit 17 supplies the detector unit 68 with a signal adjusted to the ignition circuits 56,57 while a corresponding measuring window signal for the ignition circuits 58,59 is supplied to the detector unit 81 on a line 92. Each detector unit 68 or 81 sends an output signal relating to detected preignition or knocking on a line 69 or 82. The signals on the lines 69,82 are supplied to unillustrated means contributing to prevent further pre-ignition or knocking. Conceivable measures in this respect are changing the fuel-air ratio, ignition timing, induction pressure, exhaust gas return, etc..

The cylinder identification is accomplished by each of the measuring devices 60,70 being associated with two ignition circuits 56,57 and 58,59 respectively, which are assigned to cylinders, the pistons of which are *not* simultaneously at T.D.C.. In four-cylinder Otto-type I.C. engines operating conventionally, two pistons are simultaneously at T.D.C., although only one of them is in ignition position. The other two pistons are at their bottom dead centres (B.D.C.). In the solution illustrated in FIG. 2, a signal is sent from an unillustrated crankshaft transducer to the trigger unit 6, which can establish when one or the other piston pair is at T.D.C..

During the starting sequence of the engine the trigger unit 6 triggers ignition voltage generation for two ignition circuits 56,58 or 57,59, simultaneously, as soon as the crankshaft angle signal indicates that either piston pair is at T.D.C.. Ignition during the starting sequence takes place in the cylinder, the piston and valves of which first arrive at the ignition position. Combustion and ion current are detected in the measuring means 60 or 70 associated with the respective ignition circuit of the cylinder in question. The cylinder identification signal is sent on a line 83 or 89 from the respective detector unit 68 or 81 to the trigger unit 6.

An obvious alternative solution in relation to those in FIGS. 1 and 2 also involves providing each ignition circuit with a separate measuring device as well as a separate line including a diode for supplying constant measuring voltage from the charging circuit 4. This solution makes the least demands on the control by the ignition system of the measurement window signal, but on the other hand it requires more measuring devices.

The inventive solution also enables detection of unaccomplished combustion in a cylinder, when combustion rightly should have taken place there. Unaccomplished combustion results in changed exhaust conditions, and in engines with catalytic exhaust cleaners this causes functional problems and the risk of damage to the catalyser. The unaccomplished combustion means a lack of ion current, which may be detected in a window which may have the same boundaries as the knocking window mentioned above.

The embodiments of the invention described above should not be regarded as restricting it, and the invention may be modified in a plurality of embodiments within the scope of the following claims. It is thus not necessary for the voltage supply from the outside voltage source to take place continuously during the whole of the crankshaft revolution. The measurement window unit suitably can control the measurement voltage supply in "windows", whereby ion current can only occur during these periods. The possibility of taking out the signal indicating ion current from between measuring capacitor and secondary winding should not be ignored here either.

What we claim is:

1. A method of detecting ion current in at least one ignition circuit included in an ignition system of a multi-cylinder internal combustion engine, the ignition in the cylinders following a certain order controlled by an electronic unit, in which system a measuring voltage is applied to the ignition circuit and a measuring device is used to detect ion current possibly occurring in the ignition circuit, characterized in that a substantially constant measuring voltage is applied to the ignition circuit in a ground connection between one end of a secondary winding of an ignition coil and a measuring capacitor disposed in the ground connection, the other end of the secondary winding being connected to a central electrode of an ignition means for igniting a fuel-air mixture in one of the engine cylinders, and in that ion current in the ignition circuit is detected in detecting means connected to the ground connection.

2. A method as claimed in claim 1, characterized in that a signal representing ion current is processed in the detecting means at least during a time interval corresponding to a rotation of an engine crankshaft through an angle range, within which pre-ignition may occur.

3. A method as claimed in claim 2, characterized in that a signal representing ion current is processed in the detecting means at least during a time interval corresponding to a rotation of an engine crankshaft through an angle range, within which knocking may occur.

4. A method as claimed in claim 1, characterized in that a signal from the detecting means representing possibly occurring pre-ignition and/or knocking is used to control at least one parameter affecting combustion in the engine, such that continued abnormal combustion is prevented.

5. A method as claimed in any one of the preceding claims, characterized in that for manually initiated voltage supply in starting an engine, ignition pulses are generated in the ignition circuit when a piston in the cylinder pertaining to the ignition circuit is at its T.D.C., a signal representing a time interval during which ignition generated combustion can be obtained is applied to the detecting means for the ignition circuit, and in that a signal representing ion current is processed in the detection means for detecting possible combustion during said time interval, and for delivering a corresponding output signal which is to serve as a basis for further ignition pulses generated in a predetermined order in all ignition circuits.

6. A method as claimed in claim 1, where at least a pair of ignition circuits are connected to a cylinder pair the pistons of which are at the T.D.C. simultaneously, characterized in that:

for manually initiated voltage supply for starting the engine, ignition pulses are generated simultaneously in said pair of ignition circuits as soon as the associated pistons are at T.D.C., a signal representing a time interval during which ignition generated combustion can occur is applied to the detecting means associated with two ignition circuits belonging to cylinders having their pistons at T.D.C. at different times, and in that a signal representing ion current is processed in the detecting means for detecting the possible presence of combustion during said time interval, and for delivering a corresponding output signal which is to serve as a basis for continued ignition pulses generated in all ignition circuits in a predetermined order.

7. A method of detecting ion current in a capacitive ignition system of a multi-cylinder internal combustion engine having a plurality of ignition circuits and ignition coils, comprising the steps of applying a substantially constant measuring voltage to at least one ignition circuit in a ground connection between one end of a secondary winding of an ignition coil and a measuring capacitor disposed in the connection, the other end of the secondary winding being connected to a central electrode of an ignition means for igniting a fuel-air mixture in one of the engine cylinders, detecting ion current in the ignition circuit in detecting means connected to the ground connection of said secondary winding and processing a signal representing ion current in the detecting means at least during one predetermined time interval corresponding to the rotation of the crankshaft through a certain angle range.

8. An arrangement for detecting ion current in the ignition system of a multi-cylinder internal combustion engine having a plurality of ignition circuits, the ignition in the cylinders following a certain order controlled by an electronic unit, there being included in said ignition circuits a secondary winding of an ignition coil and ignition means for igniting a fuel-air mixture in the engine cylinders, at least one of the ignition circuits being connected to an outside voltage source which causes ion current in the ignition circuit when there is combustion in the combustion chamber, characterized in that the outside voltage source is connected to the ignition circuit between a measuring capacitor and one end of the secondary winding, the other end of which is connected to a central electrode of the ignition means, and in that the capacitor is included in a line connected to ground and departing from said one end of the secondary winding, the means for detecting ion current flowing in the ignition circuit being connected to said line.

9. An arrangement as claimed in claim 8, characterized in that the ignition system is of capacitive type including a number of secondary windings corresponding to the number of ignition circuits, and in that the outside measuring voltage source is a charging circuit for the primary voltage circuits in which there are primary windings coacting with said secondary windings.

10. An arrangement as claimed in claim 9, the engine being an Otto-type engine, characterized in that at least two of the ignition circuits are connected to a common measuring capacitor, these two ignition circuits serving two conventional cylinders where one piston is at T.D.C. while the other piston is at B.D.C.

11. An arrangement as claimed in claim 8, characterized in that the detecting means coact with means for deciding at least one time interval during which ion current shall be detected.

12. An arrangement as claimed in claim 11, characterized in that a first time interval corresponds to a crankshaft angle range extending through at least 5° of a crankshaft revolution within a range of up to 90° before T.D.C. of the respective piston, and in that a second time interval corresponds to a crankshaft angle range extending over at least 5° within the range 0°-50° after T.D.C. of the respective piston.

13. An arrangement as claimed in claim 12, characterized in that a third time interval corresponds to a crankshaft angle range, which for starting the engine extends through at least 5° before respective piston T.D.C. and up to 180° after T.D.C. of the respective piston.

14. An arrangement as claimed in claim 8, characterized in that the detecting means is connected to said line between the measuring capacitor and a measuring resistor connected to ground.

* * * * *